(12) United States Patent
Fontana et al.

(10) Patent No.: US 7,117,184 B1
(45) Date of Patent: Oct. 3, 2006

(54) SYSTEM AND METHOD FOR MAINTAINING TARGET RESPONSE TIMES IN BUSINESS METHODS

(75) Inventors: James Albert Fontana, Mission Viejo, CA (US); Douglas Marshall Tolbert, Newport Beach, CA (US); Viraj Byakod, Mission Viejo, CA (US); Ronald Jay Neubauer, Thousand Oaks, CA (US); Paul Donald Koerber, Laguna Hills, CA (US); Russel Elliot Cole, Laguna Niguel, CA (US)

(73) Assignee: Unisys Corporation, Blue Bell, PA (US)

( * ) Notice: Subject to any disclaimer, the term of this patent is extended or adjusted under 35 U.S.C. 154(b) by 427 days.

(21) Appl. No.: 10/670,976

(22) Filed: Sep. 25, 2003

(51) Int. Cl.
 *G06F 15/18* (2006.01)
 *G06F 9/46* (2006.01)
 *G06F 9/52* (2006.01)
(52) U.S. Cl. .......................... 706/1; 718/101
(58) Field of Classification Search ............... 706/1; 718/101
 See application file for complete search history.

(56) References Cited

U.S. PATENT DOCUMENTS

| | | | | |
|---|---|---|---|---|
| 5,367,473 | A | * | 11/1994 | Chu et al. ................ 702/186 |
| 5,504,894 | A | * | 4/1996 | Ferguson et al. ............ 707/2 |
| 5,812,996 | A | | 9/1998 | Rubin et al. |
| 5,822,749 | A | | 10/1998 | Agarwal |
| 6,523,027 | B1 | * | 2/2003 | Underwood ................. 707/4 |
| 6,904,593 | B1 | * | 6/2005 | Fong et al. .............. 717/171 |
| 6,922,832 | B1 | * | 7/2005 | Barnett et al. .............. 718/1 |
| 2004/0123293 | A1 | * | 6/2004 | Johnson .................. 718/101 |
| 2005/0081157 | A1 | * | 4/2005 | Clark et al. .............. 715/736 |

OTHER PUBLICATIONS

Dave E. Collins and Alan D. George "Parallel and Sequential Job Scheduling in Heterogeneous Clusters: A Simulation Study using Software in the Loop", 2001, HCS Research Lab.*
Robert Snelick "S-Check: a Tool for Tuning Parallel Programs", Parallel Processing Symposium, 1997. Proceedings., 11th International Apr. 1-5, 1997 pp. 107-112.*
Chris Rees "Microsoft Application Center 2000 Component Load Balancing Technology Overview", Sep. 2000, http://www.microsoft.com/technet/prodtechnol/acs/deploy/clbovrvw.mspx.*
Robert E. Filman, Applying Aspect-Oriented Programming to Intelligent Synthesis, Workshop on Aspects and Dimensions of Concerns 14th European Conference on Object-Oriented Programming, Cannes, France, Jun. 2000.
Ribler, R.L., H. Similci, D.A. Reed, The Autopilot Performance-Directed Adaptive Control System, Future Generation Computer Systems, Special Issue of Performance Data Mining, Vol. 18, No. 1, 2001, pp. 175-187.

(Continued)

*Primary Examiner*—Anthony Knight
*Assistant Examiner*—Sergey Datskovskiy
(74) *Attorney, Agent, or Firm*—Alfred W. Kozak; Mark T. Starr; Lise A. Rode

(57) ABSTRACT

An embodiment of the present invention provides a method to establish and maintain response time goals for selected business logic contained in components, which results in chosen high priority methods that respond consistently under load, enable smoother server side resource utilization, and increased scalability. The analyzing and delaying of certain processes in order to expedite processing of more important business processes helps establish optimization of multiple business processes.

6 Claims, 9 Drawing Sheets

Component Balancer Analysis

OTHER PUBLICATIONS

Daniel A. Reed, Christpher L. Elford, Tara M. Madhyastha, Evgenia Smirni, and Stephen E. Lamm, The Next Frontier: Interactive and Closed Loop Performance Steering, Proc. 1996 Workshop on Challenges for Parallel Processing, Bloomingdale, Illinois, Aug. 1999, pp. 20-31.

Brown, Keith, Building a Lightweight COM Interception Framework, Part I: The Universal Delegator, Microsoft Systems Journal, vol. 14, pp. 17-29, Jan. 1999.

Brown, Keith, Building a Lightweight COM Interception Framework, Part II: The Guts of The UD, Microsoft Systems Journal, vol. 14, pp. 49-59, Feb. 1999.

Fisher, Ronald A., Statistical Methods for Research Workers, originally published in London by Oliver and Boyd, online at: http://air.ac.kr/reference/COM/interecpt.htm.

* cited by examiner

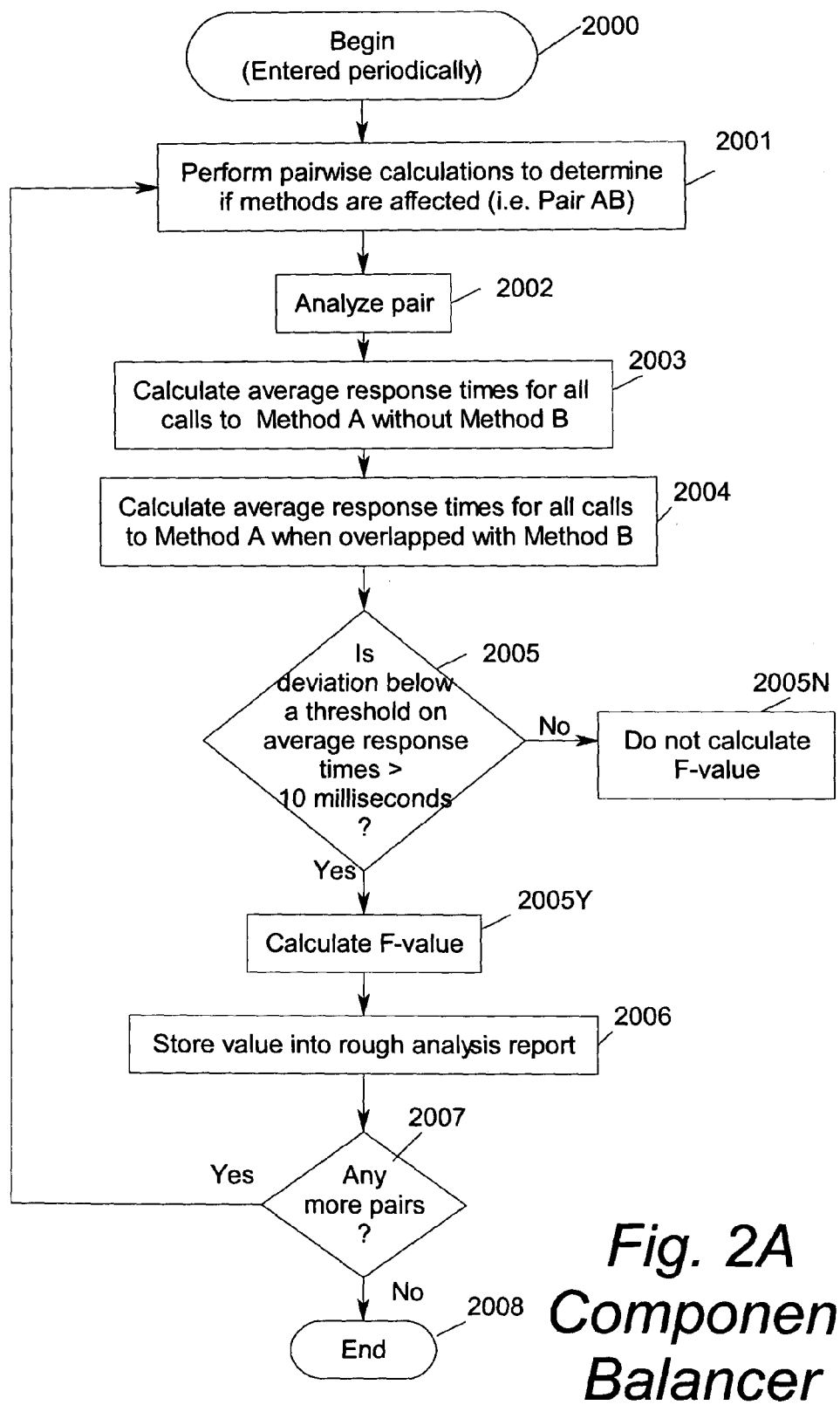
Fig. 2A Component Balancer Analysis

Component Balancer Optimizer

Fuzzy Logic

FIG. 6

SYSTEM AND METHOD FOR MAINTAINING TARGET RESPONSE TIMES IN BUSINESS METHODS

CROSS-REFERENCES TO RELATED CASES

This application is related to a co-pending application U.S. Ser. No. 10/290,812 entitled "System And Method For Managing The Application Of Parameterized Behavior To Operations In A Component Hierarchy", which is incorporated herein by reference.

This application is related to a co-pending application U.S. Ser. No. 10/626,222 entitled "Method For Reflecting In A Graphical user Interface The State Of Hierarchical Targets And Their Associations With Conditioners Obtained From A Persistent Store", which is incorporated herein by reference.

BACKGROUND OF THE INVENTION

1. Field of the Invention

The present invention generally relates to the optimization of component-based computer applications, which can be done automatically by a novice user, or manually by a user with domain knowledge without having to recompile or re-deploy the application.

2. Description of Related Art

The Component Balancer described herein establishes and maintains response time goals for selected business logic contained in methods in component-based applications. The premise for this optimization is that business logic in component methods can be driven to response-time goals by selectively delaying business logic in other component methods—e.g. two methods accessing the same table in a database.

This optimization can be done automatically by a novice user, or manually by a user with domain knowledge.

The Component Balancer leverages infrastructure technologies that support component-based optimizations, allowing the Component Balancer to work on a running system without recompiling or redeploying the application. The Component Balancer establishes and maintains response-time goals on business logic contained in methods in component technologies—such as COM+, .NET and BEA Weblogic EJB. As the load on the system varies, the Component Balancer attempts to keep methods with response-time objectives at a specified target performance level at the expense of lower priority methods.

Features of the Component balancer include automated or manual operation, an analysis capability that provides optimization hints, the ability to self-tune under variable load across machines, applications and application servers, with no changes required to the application itself. These features include the benefits of high priority methods responding consistently under variable load, and smoother resource utilization under peak load.

One related art method to which the method of the present invention generally relates is described in U.S. Pat. No. 5,822,749, entitled "Database System With Methods For Improving Query Performance With Cache Optimization Strategies". This related art method is a database system and method for improving execution speed of database queries (e.g., for transaction processing and for decision support) by optimizing use of buffer caches. The system includes an Optimizer for formulating an optimal strategy for a given query. More particularly, the Optimizer communicates with a Buffer Manager before it formulates the query plan. For instance, the Optimizer may query the Buffer Manager for the purpose of determining whether the object of interest (e.g., table or index to be scanned) exists in its own buffer cache (i.e., whether it has been bound to a particular named cache). If the object exists in its own cache, the Optimizer may inquire as to how much of the cache (i.e., how much memory) the object requires, together with the optimal I/O size for the cache (e.g., 16K blocks). Based on this information, the Optimizer formulates a query strategy or plan with "hints," which are ultimately passed to the Cache or Buffer Manager. By formulating "hints" for the Buffer Manager at the level of the Optimizer, knowledge of the query is, in effect, passed down to the Buffer Manager so that it may service the query using an optimal caching strategy—one based on the dynamics of the query itself. Based on the "hints" received from the Optimizer, the Buffer Manager can fine tune input/output (i.e., cache management) for the query. Specific Optimizer strategies are described for each scan method available to the system, including heap scan, clustered index, and non-clustered index access. Additional strategies are described for multi-table access during processing of join queries.

The present invention differs from the above prior cited art in that the prior invention, focuses on database queries, whereas the method of the present invention focuses on method calls. The method of the present invention optimizes across multiple machines and performs method optimization whereas the method of the prior related art only optimizes database queries on a single machine.

BRIEF SUMMARY OF THE INVENTION

An embodiment of the invention is the ability to accomplish optimization with the Component Balancer for the benefit of high priority methods, which respond consistently under variable load, and for a smoother server resource utilization under peak load.

The Component Balancer establishes and maintains response-time goals on "business logic"—such as COM+, .NET and WLS methods. It does this by delaying other, related business processes that can occur in different applications\application servers or on different machines. As the "load" on the system increases, the business processes with response-time goals attempt to remain at a user specified target performance level. As the load decreases, the delays on the other business processes are reduced.

The Component Balancer leverages various core technologies. The key core technology provided is the ability to wrap component methods with "conditioning" code. The inserted conditioning code is called a conditioner. Conditioning can be added and removed while an application is running. No component source code is needed and no recompilation or reconfiguration of the components is required. Multiple conditioners can be applied to a method. In addition to executing pre and post processing code, conditioners also have access to the parameters of a method, can capture and throw exceptions and can bypass the method execution. For COM+, the core of the conditioning capability is an extended version of Keith Brown's Universal Delegator. For other application servers, such as Weblogic or .NET, other interception or wrapping techniques are used.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 2A and 2B combined illustrate flowcharts of the analysis detail of the Component Balancer.

FIG. 6 is a screen shot for monitoring the user interface.

GLOSSARY ITEMS

Figure 1:
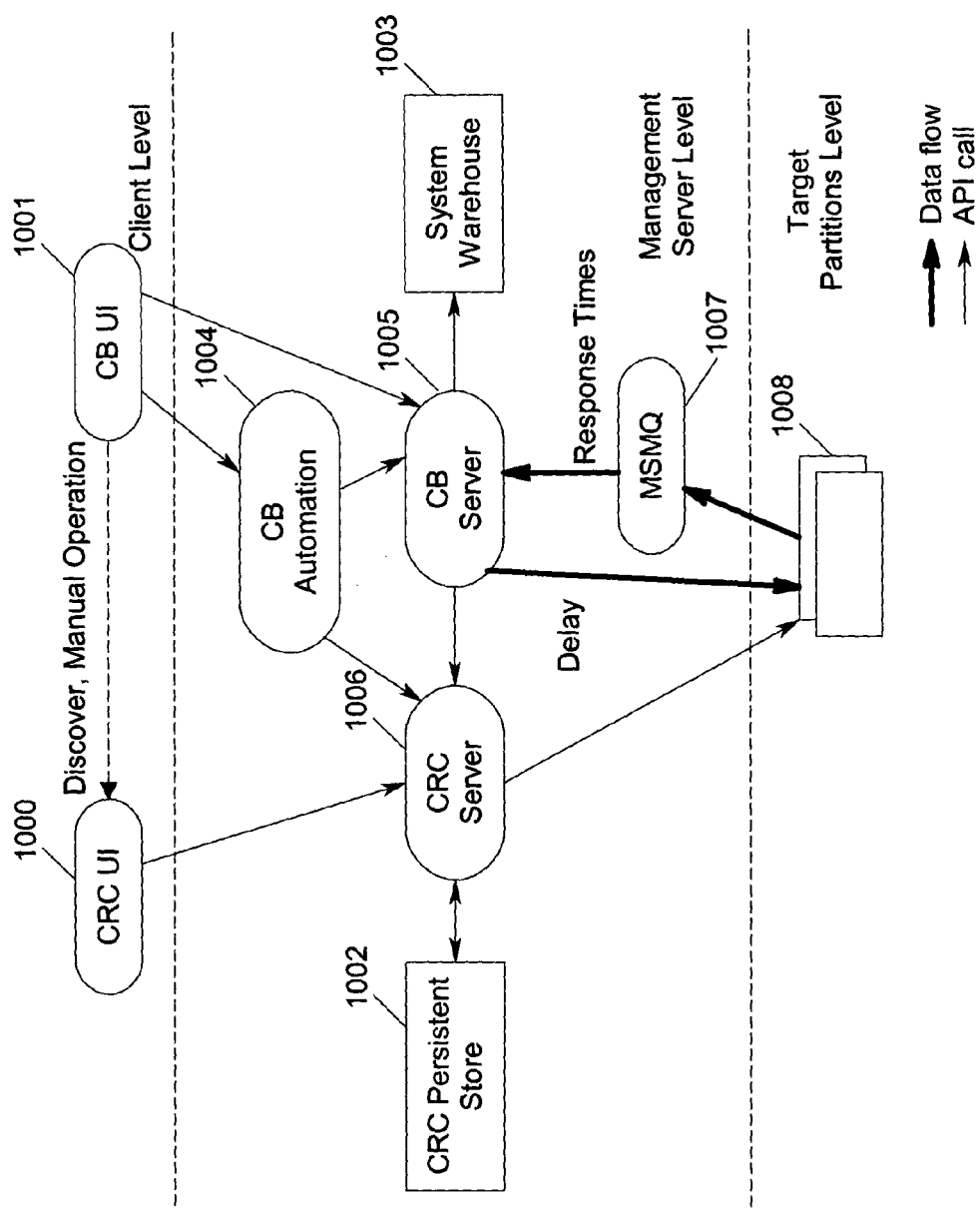
FIG. 1 is a diagram illustrating the architecture of the Component Balancer.

1. User-Defined Behavior: A specific action to be performed on a component method call.
2. Component Runtime Conditioner (CRC): A suite of tools and technologies that enable a user to tune, optimize and add-value to component-based applications. The CRC consists of core technologies and conditioning tools.
3. System Warehouse: Used to collect and store system performance data in the form of a data warehouse. The System Warehouse contains data collected from a variety of traditional sources such as system management tools, performance-monitoring tools, and system logs.
4. Conditioning Tools: Tools necessary to manage the conditioning lifecycle of discovering and capturing, organizing and conditioning components and their methods. A graphical user interface (GUI) is provided to do this.
5. Microsoft Message Queuing (MSMQ): A service from Microsoft that provides a data queuing service.
6. Manual Optimization: A User choosing to manually do the analysis step by picking a reasonable set of methods and condition them for analysis and then deciding which conditioning to deploy based on the report.
7. Automatic Optimization: Given a prioritized list of applications to optimize, the Component Balancer automation discovers and captures all components, an analysis is made to determine which methods to optimize or delay, and the appropriate optimization conditioning is then deployed.
8. Fuzzy Logic: A mathematical principle that states that something is true does not preclude the possibility that it is at least partly false. Fuzzy Logic provides a gradation of truth-value, allowing inferencing to take place at the linguistic level (e.g. if response is fast and load is OK then adjustment=none).
9. F-Value: A one-way analysis of variance technique.
10. "Defuzzify": Conversion of a fuzzy (linguistic) value into a numerical value (e.g. "slow" can range from 1 to 10).
11. "Fuzzify": Conversion of an input value into a fuzzy (linguistic) value (e.g. input can range from 97 to 99 to be a "normal temperature").
12. Runtime Data: A snap shot of component data collected at a particular time during an application runtime.
13. Interception Infrastructure: A subsystem that performs the interception on a component method call.
14. Conditioning Code: The code to be executed at runtime before and/or after on a call to a component method.
15. Component Method: A business service operation provided by a component
16. Method Call: A call from a client program to a method of a component.
17. Runtime Conditioning: Injecting user-defined conditioning code into a runtime component.
18. MSMQ: Microsoft Message Queuing—An asynchronous messaging technology.
19. Keith Brown's Universal Delegator: A technique for intercepting method calls to COM+ components. The described technique requires that the client program be modified and recompiled in order to use this capability. The present disclosure has modified this approach to no longer require these restrictions. More background is explained at the following publications:
   Brown, Keith, *Building a Lightweight COM Interception Framework, Part I: The Universal Delegator*, Microsoft Systems Journal, Vol. 14, pp. 17–29, January 1999.
   Brown, Keith, *Building a Lightweight COM Interception Framework, Part II: The Guts of the UD*, Microsoft Systems Journal, Vol. 14, pp. 49–59, February 1999.
20. Persistent Store: Data stored on disk that is available across different instantiations of an application or reboots of a computer. As opposed to non-Persistent store, which is only available during the time an application is running.
21. Component: Software components are defined as prefabricated, pre-tested, self-contained, reusable software modules—bundles of data and procedures—that perform specific functions.
22. Interface of a Component: A public contract for accessing a component's behavior.
23. Method of a Component: The actual code executing in a component that implements the interface.
24. Automation Code: The code in the Component Balancer that provides the performance of automatic optimization.
25. Calling Sequence: The order of method calls through various components. For example, method A in component B calls method C in component X, etc.
26. WLS (WebLogic Server): A J2EE product developed by BEA Corporation.

General Overview:

The major functions of the Component Balancer are:
Analyze
Configure goals
Monitor response times Analyze:

The user first picks a few significant methods and conditions them for analysis. Analysis gathers runtime data from selected methods and looks for statistical significance between pairs of methods. Analysis gives the user a good start on what methods would make good candidates for delay and what methods would be improved the most if these selected targets were delayed.

For example, if the user picks a database update method as a potential candidate for optimization, then other methods that also access that particular database are likely candidates for delay.

The user then collects data for a period of time to get a representative workload and views the analysis report to determine which methods are most affected by which other methods. This gives the user a reasonable "hint" at what method(s) might be improved and what methods could be delayed. The analysis step is optional.

Configure Goals:

The user then conditions the desired methods as either a candidate for optimization or else targets for delay and then monitors the response times of the candidates for optimization on the optimizer user interface. Methods targeted for delay can be grouped and an overall goal can be established for each group. The range of the goal is from no goal—where no delays are enabled—to the max goal—where the most aggressive delays are allowed. Goals can be changed at any time.

The user can adjust the goal and view the effect before picking a setting, or abandoning the optimization if the effect is unacceptable.

Monitor Response Times:

The individual methods in the optimization groups are graphically monitored against the goal. Running average response times in milliseconds are plotted against the response-time goal and running average calls per second are also graphed to show load trending.

DETAILED DESCRIPTION

Figure 5:
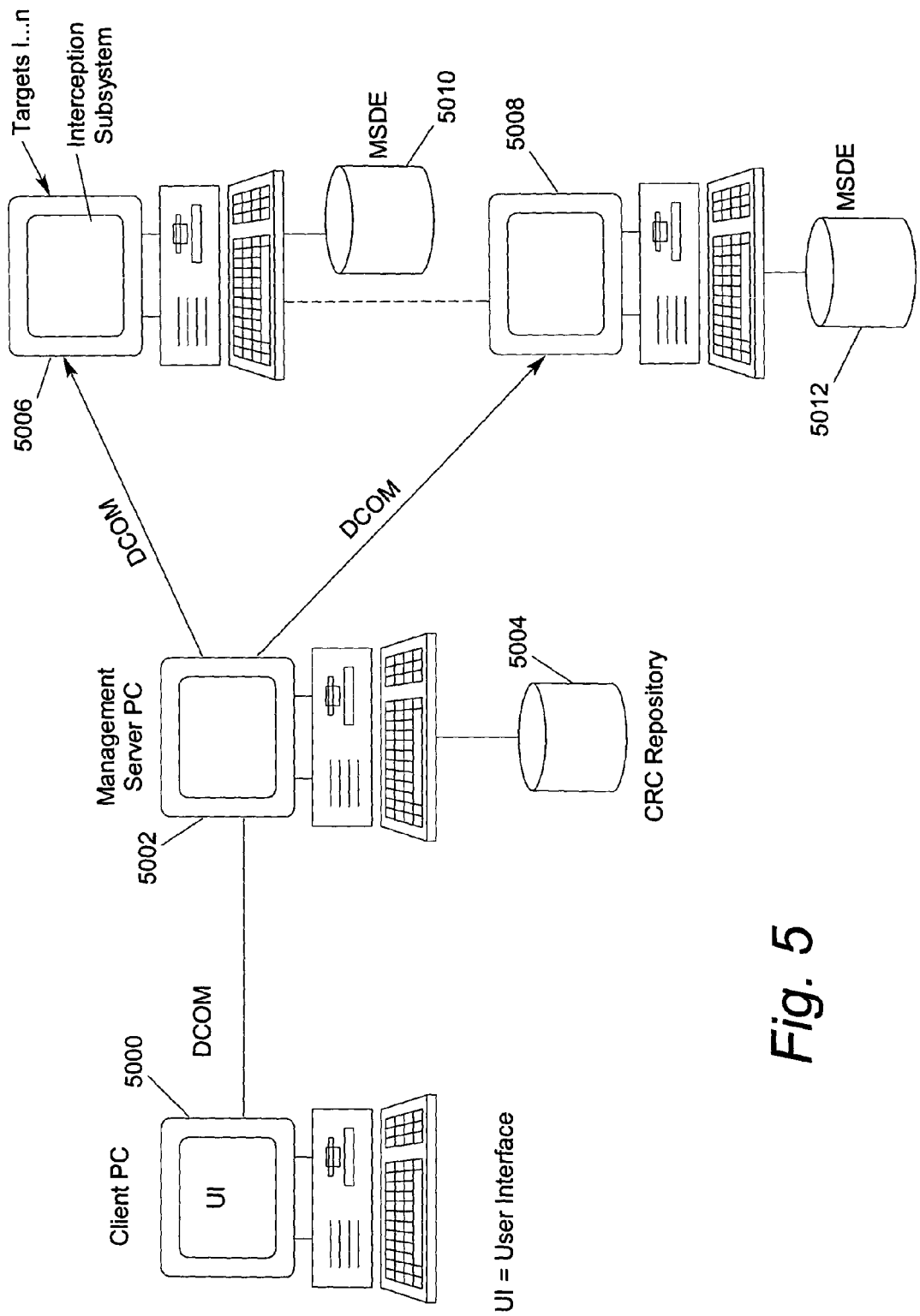
FIG. 5 is a drawing of the system of digital modules used to implement the use of the Component Balancer.

FIG. 5 illustrates the modules used in the Component Balancer. A client personal Computer (PC) exists 5000, which includes the User Interface (UI) of the Component Balancer. From the Client PC, DCOM (Distributed Component Object Model), a remote procedure call mechanism for Microsoft COM is sent to the Management Server PC 5002, which stores data in the CRC Repository 5004. From the Management Server PC, DCOM is sent to anything from computers to Unisys ES7000's, which are called targets. It is important to note that there can be any number of targets from 1 through N.

A target 5006 includes the interception subsystem. The interception subsystem is an infrastructure that performs the interception on a Component method call. This target 5006 stores data in the MSDE (Microsoft SQL Server Data Engine) 5010. This data is used by the interceptions subsystem to determine which conditioning code to apply on which methods when those methods are called. MSDE is a data engine, reliable storage engine, and query processor for desktop extensions of enterprise applications. Target 5008 is also a target, which stores information and data in the MSDE 5012.

One embodiment of the invention is a method that establishes and maintains response-time goals for selected business logic contained in methods used in component-based applications. Benefits of the described Component Balancer are high priority methods that respond consistently under variable load, and provide smoother server resource utilization under peak load. The key features of the Component Balancer include an analysis capability that provides optimization hints, the ability to self-tune under variable load across machines, applications and application servers, and the option of an automated or manual operation.

Since the conditioning is added to a running system, infrastructure and tooling is necessary to manage the conditioning lifecycle of discovering and capturing, organizing and conditioning components and their methods. This infrastructure and tooling is called the Component Runtime Conditioner (CRC). A graphical user interface (GUI) is provided to do this that is easy to use (task oriented, drag-and-drop conditioning) and has a persistent store to remember what conditioners have been applied to component's methods on which particular machines and also their current status—running, scheduled or stopped. This was described in the cited U.S. Ser. No. 10/626,222 in the Cross-References.

A multi-level API is exposed to enable core capabilities of the Component Runtime Conditioner to be embedded into applications—like the Component Balancer. Communication between user interfaces and the persistent store and between the persistent store and remote agents is done using XML (Extensible Markup Language)—a language for documents containing structured information.

The major functions of the Component Balancer are: (a) to discover and capture applications, (b) to analyze and configure optimization (manually or automatically) and (c) to monitor response-time objectives.

(a) Discover and Capture Applications:

The Component Runtime Conditioner user interface (UI) is leveraged to discover and capture machines, applications and components that can then be optimized.

(b) Analyze and Configure Optimization:

Optimization can be done manually or automatically. Manual optimization is supported directly by a Component Runtime Conditioner tool.

(b1) Manual Optimization:

To begin manual optimization, the user can optionally do the analysis step. The user picks a reasonable set of methods and conditions them for analysis. Analysis collects runtime data from the selected methods and creates a report that gives the user a good idea on what methods would be improved the most if certain other methods were delayed and what methods, if delayed, would provide the best overall performance improvement.

For example, if the user picks a database update method as a potential for optimization, then other methods that also access that database are likely candidates as targets for delay. If the user has domain knowledge of the applications, he\she can deploy the desired conditioning and skip the analysis step.

The user then conditions a set of candidate methods for optimization and for delay based on the results of analysis and monitors the results to see if the optimization is effective.

(b2) Automatic Optimization:

Given a "prioritized list" of applications to optimize, the Component Balancer automation can perform the steps given below, i.e. capture, analysis, and monitoring.

All the components for each application in the list are discovered and captured. The user can override this and tell the Component Balancer automation to use already captured components. Capturing a component consists of discovering the interfaces and methods of that component and putting this information into the persistent store.

An analysis run is made, using a time period specified by the user. Analysis conditioning is applied to all methods of all components chosen for analysis. During the analysis period, data is collected from the running applications and periodically analyzed and accumulated, looking for candidate methods for optimization and candidate methods for delay. After the analysis period is complete, a digested version of the analysis results is given to the automation code, which then determines which methods to optimize and which methods to delay. After the methods to optimize and to delay are chosen, the analysis conditioning is removed and the appropriate optimization conditioning is deployed.

(c) Monitor Response Time Objectives:

The user can monitor the progress of the analysis by viewing the analysis report and, later, can monitor how the deployed conditioning is running. The Component Runtime Conditioner tool is used to modify the deployed conditioning, if necessary.

FIG. 1 is an illustration of the general architecture of the Component Balancer. This diagram shows the major pieces of the Component Balancer and their relation to the Component Runtime Conditioner modules and the System Warehouse. It should be noted that in the diagram, CRC indicates Component Runtime Conditioner modules and CB indicates Component Balancer modules.

The architecture consists of three tiers—the client level (items 1000, 1001), the management server level (items 1002–1007) and the target partitions level (item 1008). The client level tier is where the user interfaces 1000,1001 (UI) run. The management server level houses the Component Runtime Conditioner (CRC) Server 1006 APIs and CRC Persistent Store 1002, the System Warehouse 1003 and the Component Balancer (CB) optimization and automation modules 1004, plus the CB server 1005 and MSMQ 1007. The Target partitions level can be partitions on enterprise level systems or individual systems and this is where the applications run and the optimizations take place.

The Component Balancer (CB) consists of the user interface (item 1001), an always-running optimizer CB server 1005, an automation function where, a conditioner server 1006 that is deployed to the target partition 1008 and its corresponding custom plug-in that is available through the Component Runtime Conditioner user interface (item 1000) during manual operation.

The Component Balancer (CB) user interface (item 1001) controls the optimization process. It brings up the Component Runtime Conditioner user interface (item 1000) in various modes to perform some of its tasks.

The Component Balancer server (item 1005) does the closed-loop optimization. The Component Balancer server (1005) also generates analysis reports and stores results in the System Warehouse (item 1003).

The Component Balancer conditioning code runs on the target partition 1008 where the application is running and, based on its parameters, writes response time data to a queue (MSMQ) 1007 that feeds the Component Balancer (CB) server (item 1005) or calculates delay values and delays methods. The Component Balancer (CB) uses Microsoft Message Queuing (MSMQ) (item 1007) to provide the data queuing service.

The Component Balancer automation function 1004 does automatically what a user would do manually. The Component Runtime Conditioner (CRC) and Component Balancer components are capable of recovering from management server failures and network and target partition failures or outages.

Figure 2B:
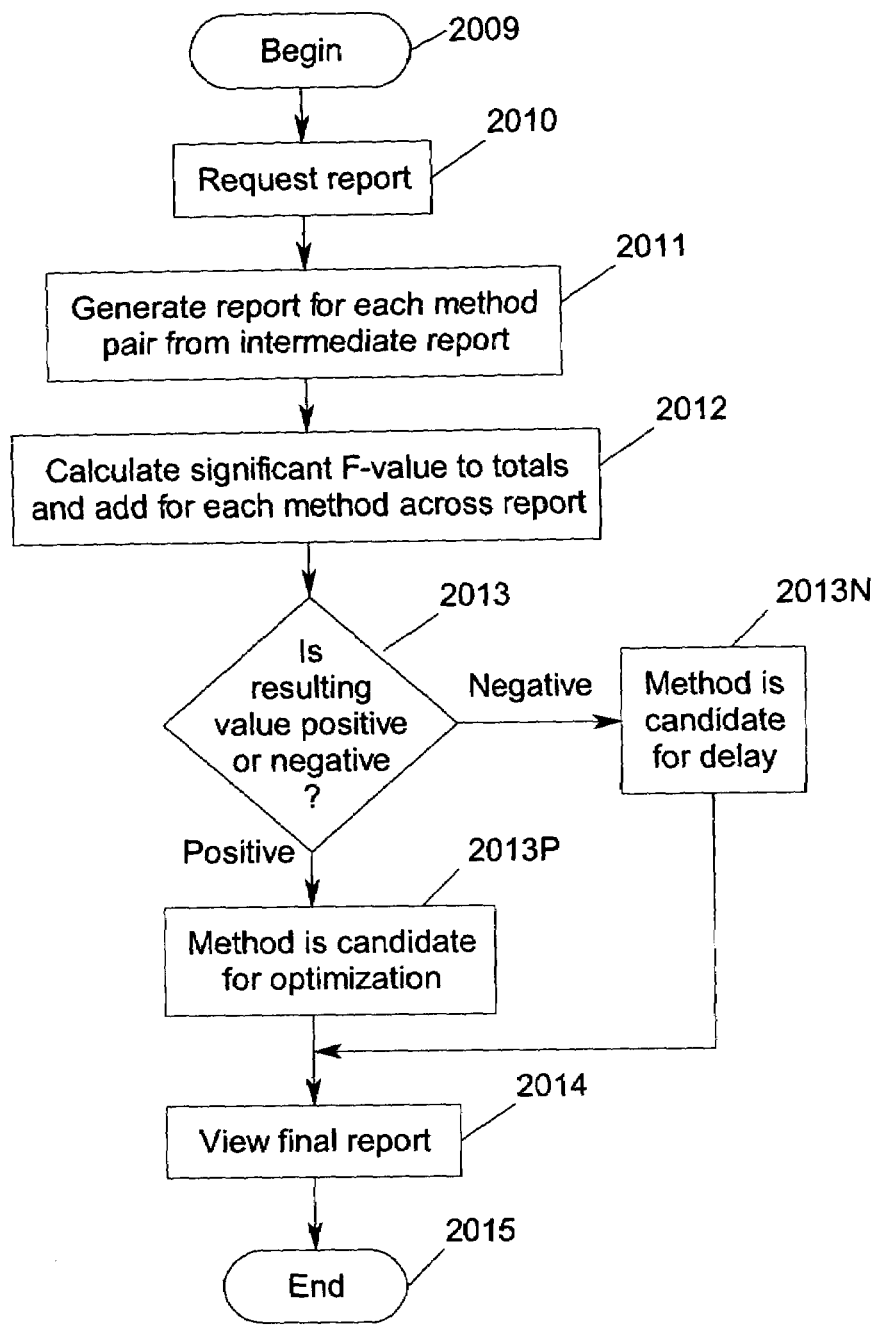

FIGS. 2A and 2B illustrate the steps and processes of the analysis function in the Component Balancer. Analysis occurs over a time interval that is specified by the user while the application is running. The overall analysis time is divided into a number of analysis periods. Each period is treated as an independent set of statistics representing the system as observed during that period. Analysis results during each period are accumulated into a raw analysis report.

FIG. 2A begins at step 2000 and runs periodically. An analysis is run every 15 minutes, or earlier if the amount of data collected crosses a threshold before 15 minutes. During each analysis period, pair-wise calculations are done on methods to determine as to which methods are affected by other methods (Block 2001). For example, deploying analysis conditioning for methods A, B and C result in pairs AB, BA, AC, CA, BC and CB being analyzed.

When pair AB is analyzed (Block 2002), the average response times for all calls to method A during the sample period when it ran "by itself" is calculated (Block 2003), that is, without the method B running at the same time. Then, the average response times are calculated for all calls to method A during the sample period when it ran overlapped with method B (Block 2004). Method A must start AFTER method B started to be considered as overlapped. This is based on the assumption that the first method "in" will get any contended resource—such as a database lock.

A statistical number called the F-value is calculated that reflects the variance between the average non-overlapped and averaged overlapped response times for A during the analysis period.

An example of the F-value calculation is shown below:

$$F_{AB} = \frac{(\overline{A} - \overline{All\ A's})^2 + (\overline{AB} - \overline{All\ A's})^2}{\dfrac{\sum_{nA}(A - \overline{A})^2}{nA} + \dfrac{\sum_{nAB}(A - \overline{AB})^2}{nAB}}$$

Where $F_{AB}$ represents the variance between A and B.

(A)=a response time of method A.

(B)=a response time of method B.

($\overline{A}$)=Average response time of A itself during the sample period.

($\overline{aB}$)=Average response time for A overlapped with B during sample period.

($\overline{All\ A's}$)=Represents the average response time of all method A's during sample period.

nA=The number of response times for method A collected during the sample period.

nAB=The number of response times for A and B overlapped collected during sample period.

The "significant" percentage is set to 60%. If the F statistic is greater than 60%, then A is assigned a +1, and B is assigned a −1.

All the above applies also to the other methods A, B, C, and their pairings AB, BA, AC, CA, BC, and CB. As an example—if B might affect A, then B would be set at −1, while A would be set at +1.

The final report adds up all the A's and all the B's (likewise for C's). For example:

A may come to =+130
B may come to =−30
C may come to =+20

So that a large positive result indicates a candidate for optimization, and a large negative result indicates a candidate for delay.

An inquiry is made at step 2005 to check if the deviation of the average response time of ALL calls to method A during this analysis period is below a given threshold, or if the average response time of ALL calls to A is below 10 milliseconds (Diamond 2005). If the answer to inquiry 2005 is "No", and the average response times were less than 10 milliseconds, the F-value is not calculated (Block 2005N). This means that it is very unlikely that method A was affected by method B since the overall variance is low. It is important to note that methods with less than 10 milliseconds average response time during the analysis period are not worth optimizing and no F-value is calculated. If the answer to inquiry 2005 is "Yes, the F-value is calculated at step 2005Y.

The individual measurements of the response times are used to calculate the F statistic. The F-value is named after the statistician R. A. Fisher. It is used to determine if the mean values of two random variables are statistically different, assuming a level of significance. The statistic is useful because it applies a proven technique to determine equality in an area of uncertainty. For example, if the two random variables each have a high level of variance, the hypothesis that their means are equal will be a function of the difference between their statistical means and also the amount of variance. One can accept or reject the hypothesis that the random variables have equal means at a given level of "significance." The work of R. A. Fisher was published as:

*STATISTICAL METHODS FOR RESEARCH WORKERS*

By Ronald A. Fisher (1925)

Originally published in London by Oliver and Boyd

Therefore, given a level of "significance" one can then determine if the average response time for method A during the sampling interval is significantly changed when running coincidentally with method B. Significance levels show one how likely a result is due to chance. The most common level, used to mean something is good enough to be believed, is 0.95. This means that the finding has a 95% chance of being true.

Methods in a calling sequence are thrown out in COM+ by utilizing the causality ID—which is a unique ID that is passed from the client through each method in the calling sequence. If A calls B (or is in a calling sequence chain with A), B affects the performance of A, but delaying B will clearly NOT improve the performance of A.

Since overlapping is not symmetric, the F-value is also calculated for method B to see if it is being affected by method A. The sample size—total number of calls to A, number of calls to A only and number of calls to A while overlapped with B- and the F-value for each method pair is stored in the raw analysis report (Block 2006). The sample size—the number of measurements taken—and the average response times calculated for overlapped only, non-overlapped only and all calls are stored in the System Warehouse and can be used for other types of analysis or optimization. At step 2007, a decision block queries if any more pairs will require analysis. The process then ends at step 2008.

FIG. 2B also illustrates the analysis function for the Component Balancer—the creation of the analysis report. On demand from the user or the automation code, the raw analysis report is digested in two steps before being given back. The process begins at step 2009, and follows by a report being requested by the user at step 2010. The next step 2011 generates an intermediate report for each method pair and accumulates the number of statistically significant F-values accumulated over the life of the analysis (Block 2011). An F-value is considered statistically significant if it is above 60% probability for the sample size. Sample sizes for non-overlapped and overlapped operations must each be greater than 10. A statistically significant variance indicates a possible interference between a pair of methods and that there is a possibility that the performance of one method can be improved under a load by delaying the other method.

The next step 2012 involves processing the method pairs to calculate the significant F-values and add them to the intermediate report. Then query block 2013 asks whether the resulting value is positive or negative. Significant differences for methods affected by other methods when considered positive are then assigned a score of +1 (Block 2013P), which indicates the method is a candidate for optimization. Significant differences for methods affecting other methods are considered negative and assigned a score of −1 (Block 2013N), indicating the method as a candidate for delay. A number of independent time samples are used in the analysis process. During the step 2012, the scores from each of these time samples are accumulated. If the resulting value is positive, the method is considered a candidate for optimization. If the resulting value is negative then the method is considered a candidate for delay. At step 2014, there is a viewing of the final report.

A simple COM+ application was developed to test and verify analysis results. The application has one component with four methods: getSpecialOffers, deposit, withdraw and checkBalance. The application internals were as follows: deposit directly affects checkBalance; withdraw calls checkBalance and getSpecialOffers runs without interfering with or being interfered with other methods.

A test harness was also developed to drive the application with a random workload. A 25-minute run was made on a single processor laptop, with eight users per method being called at a random rate between 0 and 900 milliseconds. The results are given in FIG. 7 below.

The top three lines in the report show the final digested results, the bottom four lines the intermediate results. As expected, deposit (−16=−12−6+1+1) is shown as the only potential delay, with checkBalance (11=12−1) a good potential for optimization, followed by withdraw (5=6−1). One would expect numbers like this as withdraw is indirectly affected by deposit.

Figure 3:
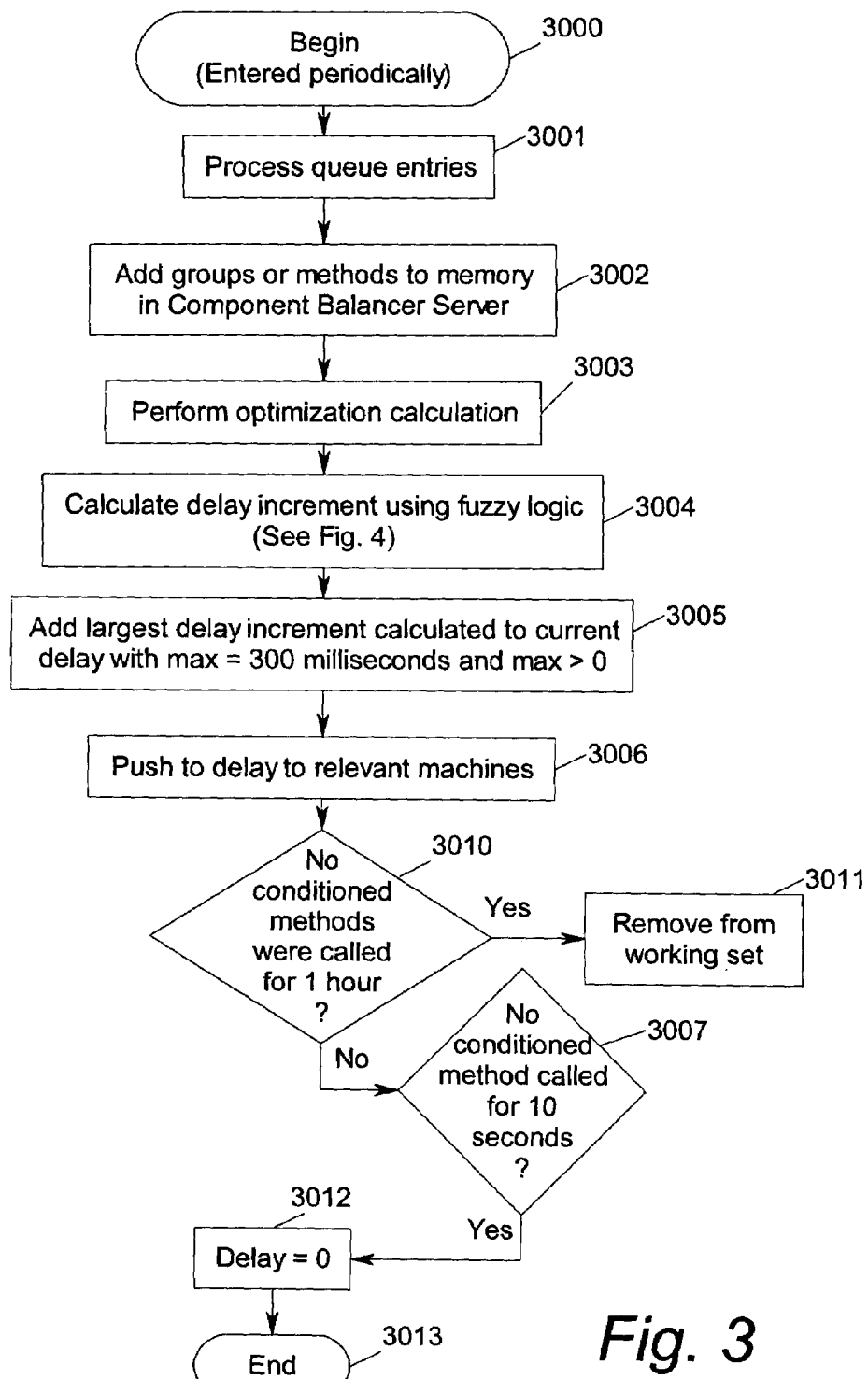
FIG. 3 illustrates a flowchart of the optimization detail of the Component Balancer.

FIG. 3 is a flowchart, which illustrates the optimization function of the Component Balancer. Queue entries are processed in real time as they come in from the target partitions 1008 of FIG. 1 as in the step of Block 3001 of FIG. 3. As new groups or methods are encountered in the queue entries, they are added to the working set in memory in the Component Balancer server (Block step 3002). The working set contains the information necessary to do the optimization—such as running average response times and calls per second, etc.

Optimization calculations are done every few seconds on each group in the working set (Block step 3003). A delay increment is calculated using fuzzy logic for each method targeted for optimization in the group (Block step 3004). The delay increment can be positive or negative. The largest delay increment for methods in the group is chosen and added to the current delay—but not allowed to exceed a maximum of 300 milliseconds or to go below zero (Block step 3005). The delay conditioner from the CB Server 1005 (FIG. 1) is given a maximum delay factor between 1 and 3 that it uses to calculate the delay it actually uses on the method—so the maximum any method can be delayed is 900 milliseconds. The Component Balancer 1004 (FIG. 1) automation uses a maximum delay of 3.

The calculated delay is pushed out to the machines where the delayed methods are located by writing a registry key entry on those machines (Block step 3006). An inquiry is then made to check if no conditioned methods were called for a one-hour period (Diamond step 3010). If one hour elapses with no queue entries for a method (Yes to inquiry step 3010), that method and all of its information is removed from the working set (Block step 3011). If the answer to inquiry step 3010 is No, and no activity has occurred in the working group for 10 seconds, which is checked by inquiry step 3007—that is, no conditioned methods were called—the delay is set to zero (Block step 3012). The process then ends at bubble step 3013.

Figure 6:
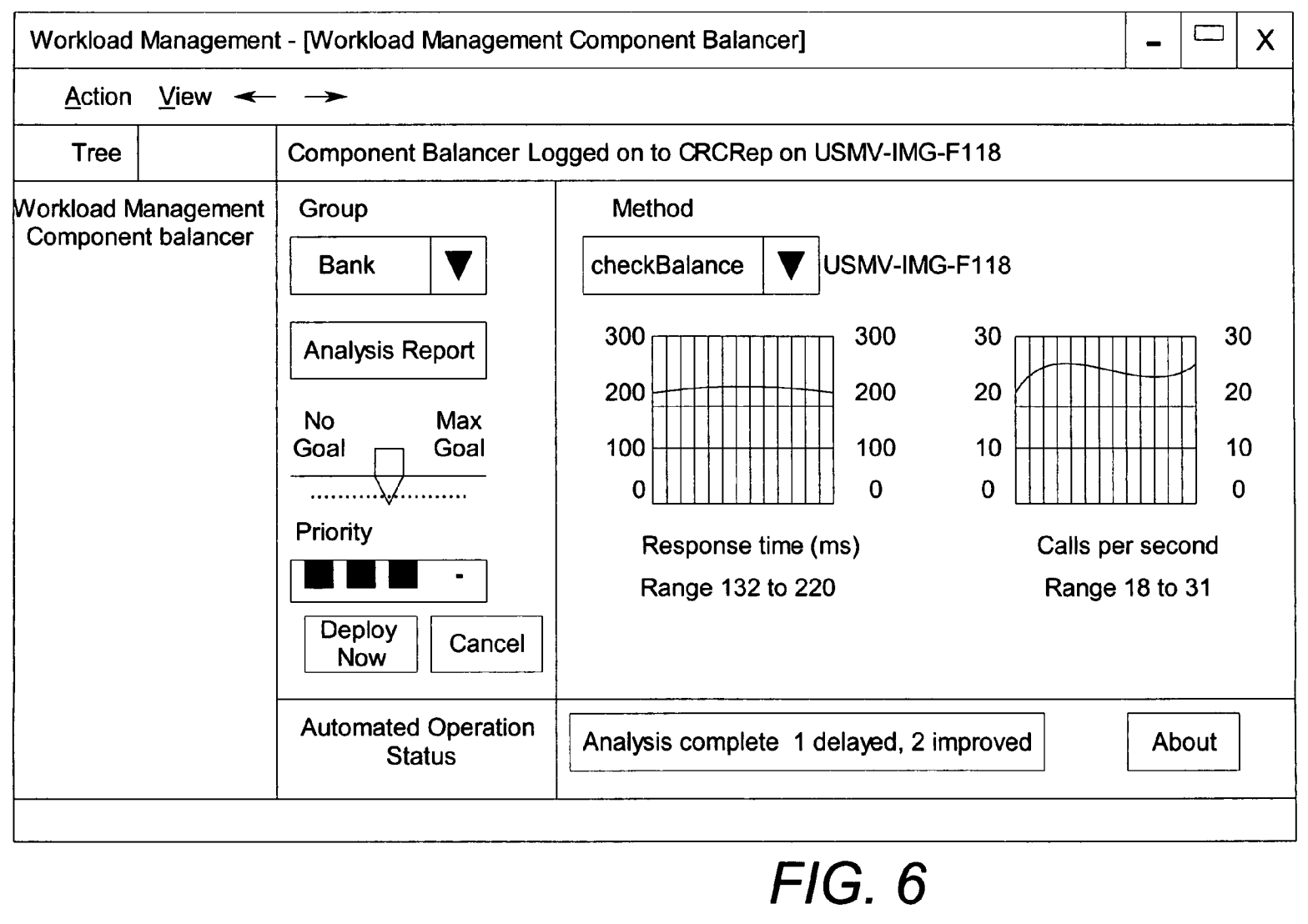

The Monitoring of Response Time Goals is shown in FIG. 6. The Component Balancer user interface allows the user to monitor the response times of groups of methods selected for optimization. An overall goal can be established for each group. The range of the goal is from no goal—where no delays are enabled—to the maximum goal—where the most aggressive delays are allowed.

The user can adjust the goal and view the effect before picking a setting, or abandoning the optimization if the effect is unacceptable.

The individual methods chosen for optimization in a group are graphically monitored against the goal. Running average response times in milliseconds are plotted against the response time goal in FIG. 6. Running average transaction calls per second are also graphed to show method load trending.

Figure 8:
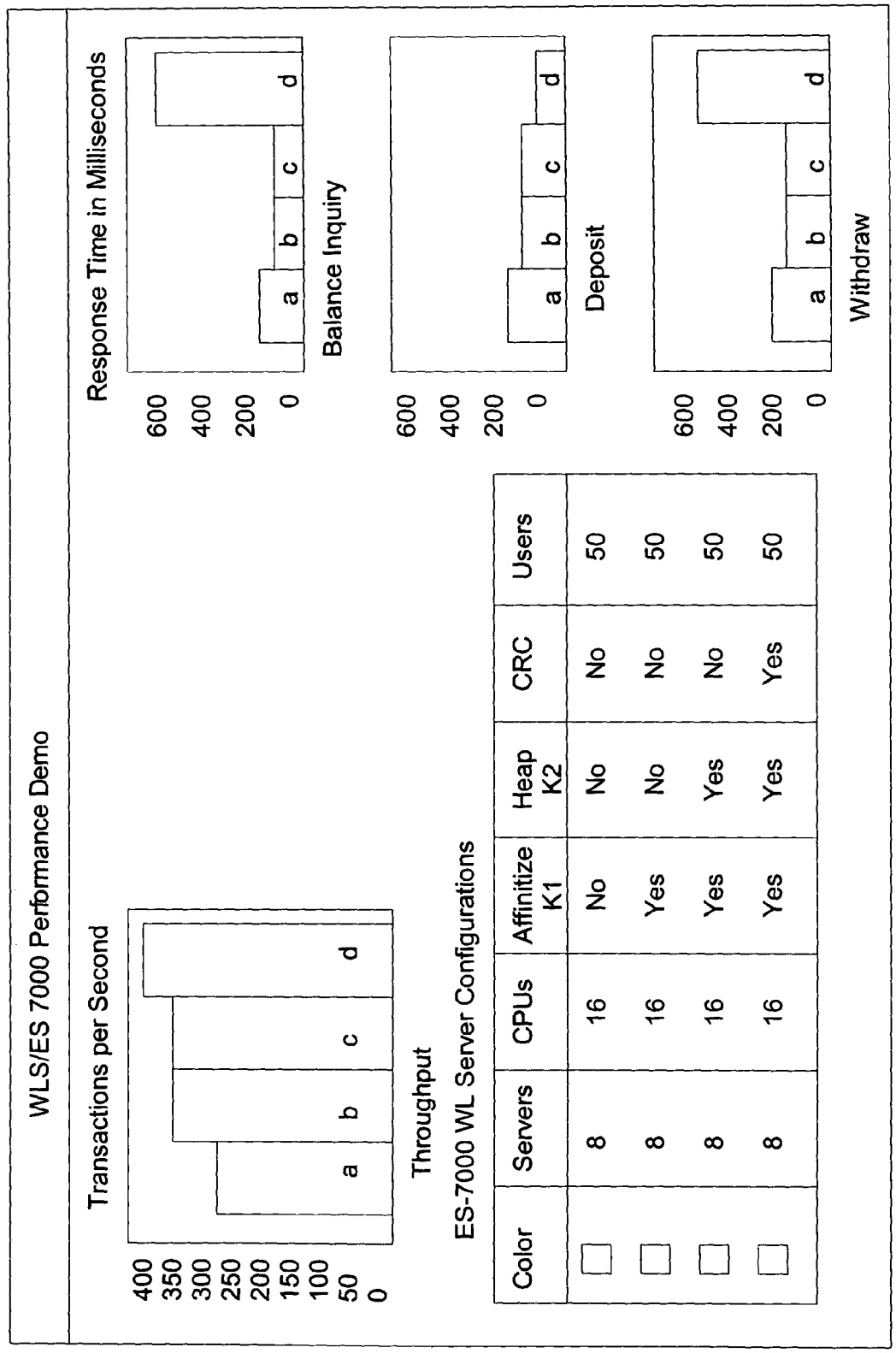
FIG. 8 is an example of a performance demo utilizing three methods.

Test Results:

A simple Weblogic application was developed that was a stripped down version of an IBM banking benchmark used for testing J2EE application server performance. This version has a single session bean with three methods: balanceInquiry, deposit and withdraw in FIG. 8. Each method accesses a SQL database. A test harness that drove the application and monitored the responses was also created. The test harness accesses the bean directly and does not go through a web page, so actual bean response times are being monitored and optimized. In the test results below, the test harness ran on the system being optimized, so no network traffic was involved.

Figure 7:
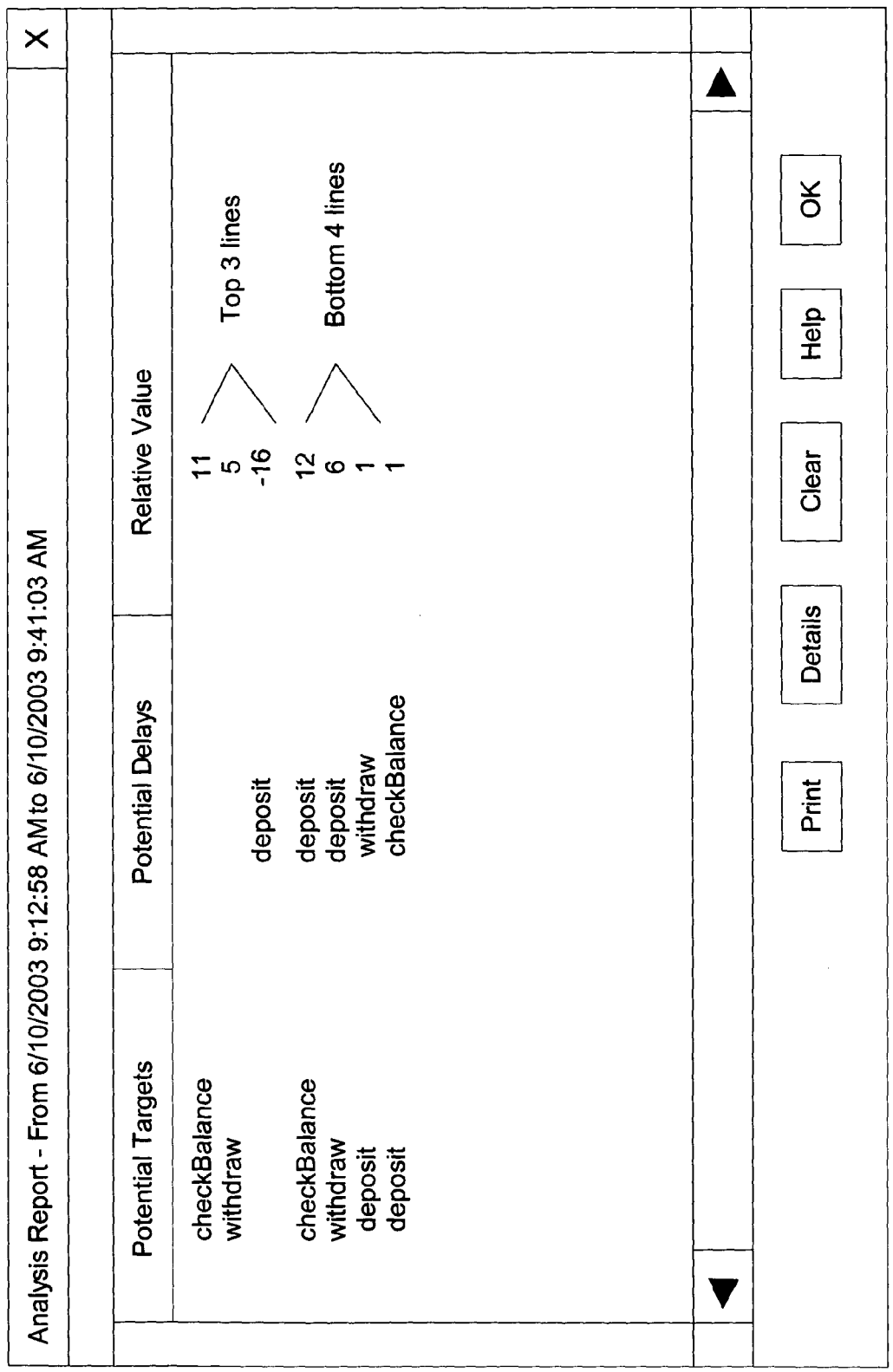
FIG. 7 is a drawing screen of the Analysis Report.

The goal was to optimize the response time of the deposit method at the expense of the other two methods (FIG. 7). The test was run with a workload equally distributed among the three methods with 50 users spread across 8 WLS servers on an ES (Enterprise Server) system with 16 processors. The results are given in FIG. 8.

The end columns (FIG. 8, top and bottom) under the Response Time in Milliseconds show response times for the three methods without and with Component Balancer optimization. The faster response times a, b, c show results of optimization, and the two columns K1, and K2 in the middle show the results of other optimizations that were applied prior to Component Balancer optimization. These optimizations were affinitizing processors and adjusting heap sizes.

Figure 4:
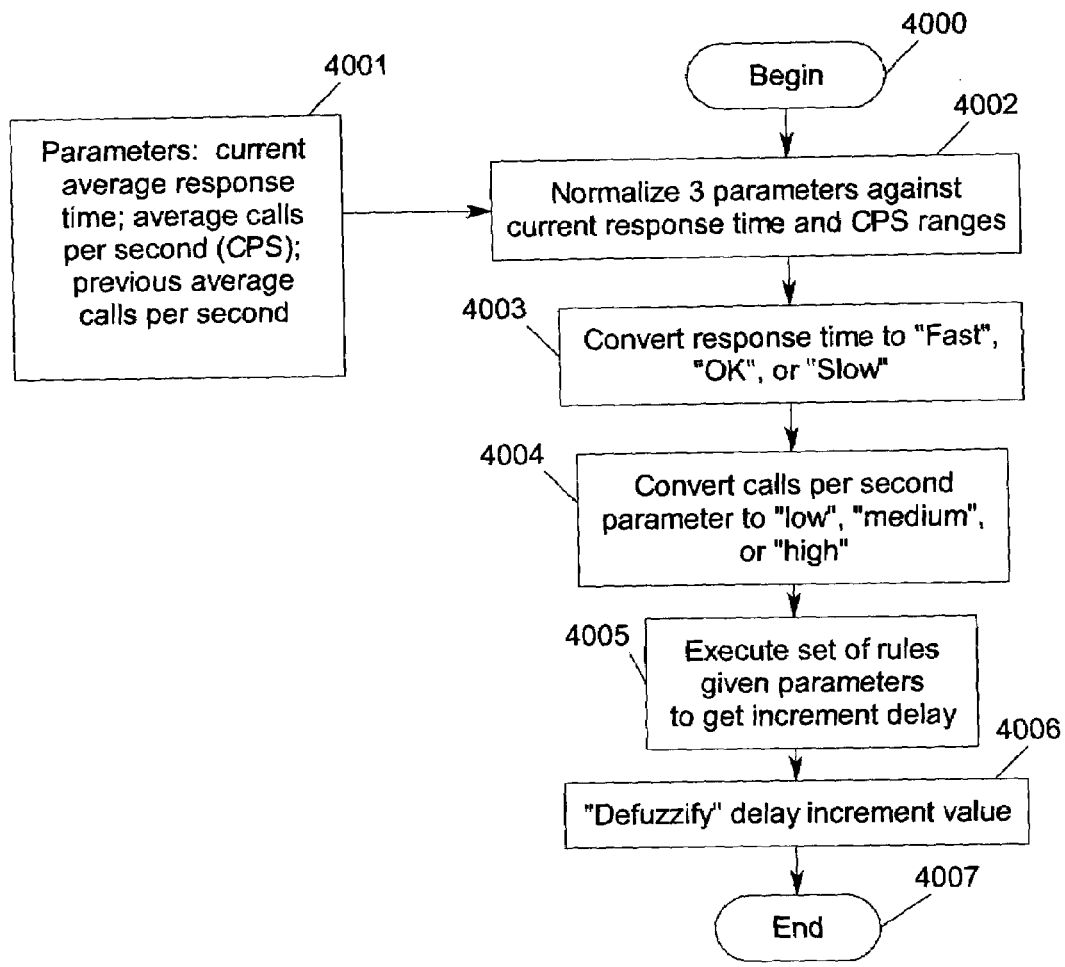
FIG. 4 illustrates a diagram of the fuzzy logic used in the Component Balancer.

FIG. 4 is a diagram illustrating the fuzzy logic used in the Component Balancer of FIG. 1. The fuzzy logic takes three parameters (Block 4001)—the current average response time, the current average calls per second (cps) and the previous average calls per second for trending—that is, to determine whether the load is increasing or decreasing over time. The two average calls per second values are used to determine load trending. The process begins at step 4000, and all parameters are normalized to values between 0 and 100 against the current response time and cps ranges before they are passed to the fuzzy logic (Block 4002).

The parameters are "fuzzified"—the response time is converted to "fast", "ok" and "slow" at step 4003, and the calls per second are converted to "low", "medium" and "high" at step 4004. The fuzzy logic executes a set of rules given these parameters (Block 4005). For example, if the response time is ok and the current cps are high and the previous cps are low, then the fuzzy logic outputs a positive delay increment. This means that, since the load has increased, a response time increase is anticipated and a bigger delay most likely is needed for the methods selected for delay in order to maintain the response times of the methods being optimized. The delay value is then "defuzzified", that is, converted back to a number in the accepted range and returned (Block 4006) and the process ends at bubble 4007.

The delay increment moves smoothly over its allowed range based on how "ok" the response time is, how "high" the current cps are and how "low" the previous cps were as the fuzzy inputs can take on a range of values. The target response time is the current maximum response time (100%) if the maximum goal is chosen. No optimization is done if no goal (0%) is chosen. For any goal in-between, the target response time is in the same relative range between the current lower and upper response times as the goal is between 0 and 100%. For example, if the goal is 50 and the response time range is between 50 to 150 milliseconds, then the response time goal will be 100 milliseconds.

The upper response time value and lower cps value are reset every minute. Doing this forces the optimization to squeeze towards an optimum target response time. The lower response time value indicates the current best value that the method can run at. The upper cps value indicates the current best throughput for the method.

Described herein has been a method to provide analysis and optimization of Component-Based applications. A Component Balancer establishes and maintains response-time goals for selected business logic, which is contained in component-based applications. This can be accomplished by selectively delaying the business logic used in other component methods, possibly in other applications or on other machines. This can be done without re-compiling or re-deploying the applications involved. Thus, even as the load on the system varies, the Component Balancer works to maintain the response time goals, which were set. This is done at the expense of lower priority methods. This allows smoother resource utilization under varying and peak loads.

While one embodiment of the invention has been illustrated, other embodiments are possible which are still defined by the attached claims.

What is claimed is:

1. In a component balancer system utilizing a computer for storing and executing a software program, a process for optimizing the sequence of processing component-based transactional applications, comprising the steps of:

(a) selecting several methods (A,B,C, . . . N) to be conditioned for analysis;
(b) gathering runtime data from said selected methods in order to find statistical operating significance between selected pairs (AB, BA, AC, CA, BC, CB, . . . ) of methods;
(c) collecting data to get a representative workload involving said pairs (AB, BA, AC, CA, BC, CB, . . . ) of said selected methods;
(d) establishing an analysis report to determine when said method pairs (AB, BA, AC, CA, BC, CB, . . . ) are processed to determine the average response time for processing when methods A,B,C, . . . N are run singly (non-overlapped) and when method pairs are run overlapped as AB, BA, AC, CA, BC, CB, . . . ;
(e) calculating a statistical number (F-value) which indicates the variance between average non-overlapped response ties for A,B,C, . . . N and average response times for overlapped pairs of methods AB, BA, AC, CA, BC, CB, . . .
(f) inquiring if the deviation in response times is below a threshold or if the average response time is below t milliseconds;
(g) selecting, above a threshold or an average response time, method calls having a deviation greater than t milliseconds;
(h) optimizing those method calls indicating a deviation greater than a threshold n involving an average response time greater than t milliseconds said optimization being effectuated by injecting code into a running application.

2. In a component balancer system utilizing a computer for storing and executing a software program, a process for optimizing the sequence of processing component-based transactional applications, comprising the steps of:
(a) selecting several methods (A,B,C, . . . N) to be conditioned for analysis;
(b) gathering runtime data from said selected methods in order to find statistical operating significance between selected pair (AB, BA, AC, CA, BC, CB, . . . ) of methods;
(c) collecting data to get a representative workload involving said airs (AB, BA, AC, CA, BC, CB, . . . ) of said selected methods;
(d) establishing an analysis report to determine when said method airs (AB, BA, AC, CA, BC, CB, . . . ) are processed to determine the average response time for processing when method A,B,C, . . . N are run singly (non-overlapped) and when method pairs are run overlapped as AB, BA, AC, CA, BC, CB, . . . ;
(e) calculating a statistical number (F-value) which indicates the variance between average non-overlapped response times for A,B,C, . . . N and average response times for overlapped pairs of methods AB, BA, AC, CA, BC, CB, . . .
inquiring if the deviation in response times is below a threshold or if the average response time is below t milliseconds;
(g) selecting, above a threshold or an average response time, method calls having a deviation greater than t milliseconds;
(h) optimizing those method calls indicating a deviation greater than a threshold n involving an average response time greater than t milliseconds said optimization being effectuated by injecting code into a running application, wherein step (h) includes the step of:
(h1) delaying the processing of one method in an overlapped pair of methods.

3. The method of claim 2 wherein step (h) further includes the step of:
(h2) removing a method if a period of time H, elapses during which that method has not been called.

4. A component balancer system for setting and managing response time goals for the processing of multiple component-based application methods (A,B,C, . . . N) said system utilizing a computer for storing and executing a software program, and wherein said application methods follow a fixed execution profile, said system comprising:
(a) means to discover and capture applications, transactional machines and components to be processed using a component runtime conditioner (CRC);
(b) means to analyze pairs of methods (AB, BA, AC, CA, BC, CB) to determine which method response times are affected by other methods;
(c) means to select those method pairs which show a substantial variance between the non-overlapped and the overlapped response times during the period involved with means (b) to analyze pairs;
(d) means to optimize the processing of selected method pairs by injecting code into a running application;
(e) means to apply delays in the processing of one associated method of a method pair said means operating to change the execution profile of said transactional applications.

5. The system of claim 4 where said means (e) to condition delays includes:
(e1) means to calculate said delay as a delay parameter using a fuzzy logic method to optimize said processing.

6. The system of claim 5 which includes:
(e2) means to adjust said delay increment according to the load on the system as sensed by the number of calls per second.

* * * * *